US009627706B2

(12) United States Patent
Ichihara et al.

(10) Patent No.: US 9,627,706 B2
(45) Date of Patent: Apr. 18, 2017

(54) FUEL-CELL-STACK MANUFACTURING METHOD AND MANUFACTURING DEVICE

(71) Applicant: Nissan Motor Co., Ltd., Yokohama-shi, Kanagawa (JP)

(72) Inventors: Keiji Ichihara, Yokohama (JP); Akio Hoshina, Yokohama (JP); Hiroshi Watanabe, Yokohama (JP); Kazuhiro Kageyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 69 days.

(21) Appl. No.: 14/782,806

(22) PCT Filed: Mar. 20, 2014

(86) PCT No.: PCT/JP2014/057900
§ 371 (c)(1),
(2) Date: Oct. 7, 2015

(87) PCT Pub. No.: WO2014/171260
PCT Pub. Date: Oct. 23, 2014

(65) Prior Publication Data
US 2016/0308238 A1 Oct. 20, 2016

(30) Foreign Application Priority Data
Apr. 15, 2013 (JP) .................................. 2013-085251

(51) Int. Cl.
*H01M 8/24* (2016.01)
*H01M 8/248* (2016.01)
(Continued)

(52) U.S. Cl.
CPC ......... *H01M 8/248* (2013.01); *H01M 8/0276* (2013.01); *H01M 8/241* (2013.01);
(Continued)

(58) Field of Classification Search
CPC ..... H01M 8/248; H01M 8/241; H01M 8/0276
See application file for complete search history.

(56) References Cited

U.S. PATENT DOCUMENTS 9,318,767 B2 * 4/2016 Barnett .................... F16J 13/14
2007/0269702 A1 * 11/2007 Nakajima ........... H01M 8/0276
429/442
(Continued)

FOREIGN PATENT DOCUMENTS

CN 101689671 A 3/2010
EP 2 109 912 A1 10/2009
(Continued)

Primary Examiner — Stewart Fraser
(74) Attorney, Agent, or Firm — Global IP Counselors, LLP

(57) ABSTRACT

A method is provided for manufacturing a fuel-cell stack that has a laminate including of a plurality of fuel cells that are laminated together. In each of these fuel cells, an MEA has an anode and a cathode joined respectively to the two sides of an electrolyte membrane is sandwiched between a pair of separators. The aforementioned method has the following steps: a sealing member layout step, in which fuel cells with sealing members applied at least between adjacent fuel cells are laminated together, forming a fuel cell module; and a pressure application step, in which pressure is applied to the fuel cell module in the lamination direction of the fuel cells, forming sealed regions from the sealing members. The lamination-direction thickness of the fuel cell module is controlled by controlling the amount of pressure applied to the fuel cell module in the pressure application step.

20 Claims, 14 Drawing Sheets

(51) Int. Cl.
     *H01M 8/0276*    (2016.01)
     *H01M 8/241*      (2016.01)
     *H01M 8/0286*    (2016.01)

(52) U.S. Cl.
     CPC ...... *H01M 8/0286* (2013.01); *H01M 2250/20* (2013.01); *Y02P 70/56* (2015.11)

(56) References Cited

U.S. PATENT DOCUMENTS

| | | | | |
|---|---|---|---|---|
| 2008/0118811 A1* | 5/2008 | Okabe | ................ | H01M 8/0247 429/483 |
| 2009/0197142 A1* | 8/2009 | Niimi | ................ | H01M 8/0276 429/414 |
| 2009/0280359 A1 | 11/2009 | Bogumil et al. | | |
| 2011/0123882 A1* | 5/2011 | Kim | ..................... | H01M 8/248 429/428 |
| 2012/0088179 A1 | 4/2012 | Kwak et al. | | |
| 2012/0264032 A1* | 10/2012 | Watanabe | ............. | H01M 8/242 429/467 |
| 2015/0064600 A1* | 3/2015 | Katsuno | ................. | B32B 37/06 429/482 |
| 2015/0372318 A1* | 12/2015 | Miyabata | ............ | H01M 8/2425 429/470 |
| 2016/0072136 A1* | 3/2016 | Kageyama | .......... | H01M 8/0273 429/463 |

FOREIGN PATENT DOCUMENTS

| | | |
|---|---|---|
| JP | 2009-129584 A | 6/2009 |
| WO | 02/09216 A2 | 1/2002 |
| WO | 2008/089977 A1 | 7/2008 |

\* cited by examiner

FUEL-CELL-STACK MANUFACTURING METHOD AND MANUFACTURING DEVICE

This application is a U.S. National stage application of International Application No. PCT/JP2014/057900, filed Mar. 20, 2014, which claims priority to Japanese Patent Application No. 2013-085251 filed in Japan on Apr. 15, 2013. The entire disclosure of Japanese Patent Application No. 2013-085251 is hereby incorporated herein by reference.

BACKGROUND

Field of the Invention

The present invention relates to a fuel cell stack manufacturing method and a manufacturing device.

Background Information

A fuel cell stack is obtained by laminating a plurality of fuel cell modules, which are obtained by laminating a predetermined number of fuel cells, to make a laminate that covers the side faces of the laminate with a chassis, disposing plates on both ends in the lamination direction and fastening them with bolts or the like. The area between a fuel cell and another fuel cell that configure a fuel cell module, as well as the area between fuel cell modules, is sealed so that fuel, oxidizing agents, and cooling water that flow inside of the laminate will not leak. The central portion, when viewing the fuel cell module in a planar view, is a region where fuel gas and oxidizing agents flow and where power generation occurs; therefore, the sealing member cannot be provided to this region, and thus, the sealing member is provided to the outer peripheral part of the fuel cell module.

In this manner, the sealing member is provided only to the outer peripheral part of the fuel cell module; as a result, there are cases in which the thickness of the module in the lamination direction is uneven between the outer peripheral part to which a sealing member is provided and the central portion to which a sealing member is not provided. If there is a difference between the thickness of the central portion and the thickness of the outer peripheral part of the module, there is the risk that a good sealing property cannot be obtained due to the sealing member being insufficiently compressed. Accordingly, the keeping the thickness of the module uniform between the central portion and the outer peripheral part is desirable. As a technique to keep the thickness of the module uniform, for example, there is that which disposes a gap-maintaining structure (a so-called spacer) on the outer periphery of a membrane electrode assembly, which is clamped by a separator, between the membrane electrode assembly and the separator (refer to Japanese Laid-Open Patent Application No. 2010-272474).

SUMMARY

When trying to regulate the thickness of the fuel cell module with a spacer, such as in Patent Document 1, if the spacer is formed to be thinner than expected due to dimensional variability, the outer peripheral part of the module will be more excessively crushed than expected to match the spacer. If the outer peripheral part of the module is excessively crushed and the sealed portion by the sealing member is formed, there are cases in which, even if a necessary number of fuel cell modules for the fuel cell stack are laminated and plates are disposed to clamp both ends in the lamination direction, the central portion will not be crushed to the thickness of the outer peripheral part; as a result, the thickness of the fuel cell module cannot be made to be uniform. In such a case, there is the problem that the sealing member is not sufficiently compressed due to the bulging of the central portion, and a good sealing property cannot be obtained.

Therefore, in order to solve the problems described above, an object of the present invention is to provide a fuel cell stack manufacturing method and a manufacturing device that are able to secure the compression amount of the sealing member disposed on the fuel cell module.

The present invention, which achieves the object described above, is a fuel cell stack manufacturing method comprising a fuel cell module in which are laminated a plurality of fuel cells, whose membrane electrode assembly is clamped by a pair of separators. The fuel cell stack manufacturing method according to the present invention comprises a sealing member layout step, in which a sealing member is disposed on the outer peripheral part of the end surfaces that face each other between at least one fuel cell and another adjacent fuel cell, and a fuel cell module is formed by laminating the fuel cells; the method also comprises a pressure application step in which pressure is applied to the fuel cell module in the lamination direction of the fuel cells, forming sealed regions from the sealing members. In the fuel cell stack manufacturing method according to the present invention, the lamination-direction thickness of the fuel cell module is controlled by controlling the amount of pressure applied to the fuel cell module.

In addition, the fuel cell stack manufacturing device according to the present invention comprises: a sealing member layout unit for disposing a sealing member on the outer peripheral part of end surfaces that face each other between at least one fuel cell and another adjacent fuel cell; a laminating unit that forms a fuel cell module by laminating the fuel cells to which the sealing member is disposed; a pressure application unit that applies pressure to the fuel cell module in the lamination direction of the fuel cells; and a control unit for controlling the operation of at least the pressure application unit. In the fuel cell stack manufacturing device according to the present invention, the lamination-direction thickness of the fuel cell module is controlled by the control unit controlling the amount of pressure that is applied to the fuel cell module via the pressure application unit.

BRIEF DESCRIPTION OF THE DRAWINGS

Referring now to the attached drawings which form a part of this original disclosure.

DETAILED DESCRIPTION OF THE EMBODIMENTS

Figure 1A:
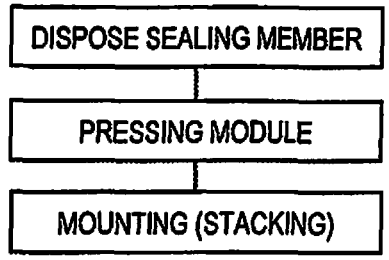
FIG. 1A is a time chart illustrating the fuel cell stack manufacturing method according to a first embodiment of the present invention.

Embodiments of the present invention will be explained below, with reference to the appended drawings. The description below does not limit the technical scope or the meanings of the terms described in the Claims. The dimensional ratios in the drawings are exaggerated for the convenience of the explanation, and they are different from the actual ratios.

First Embodiment

Figures 1B, 1C:
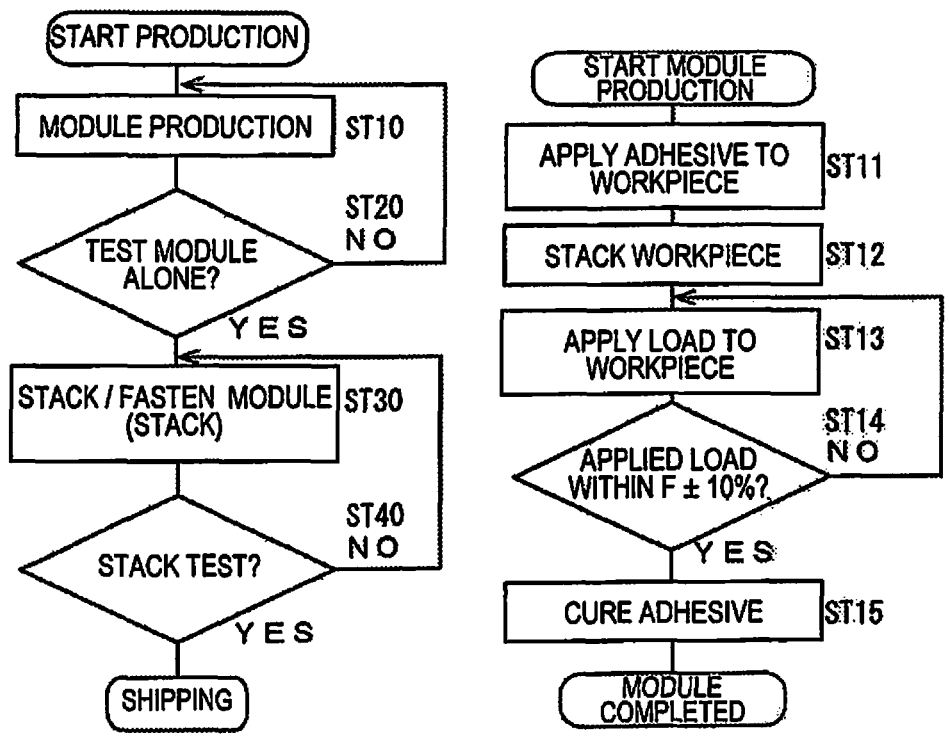
FIG. 1B is a flowchart illustrating the fuel cell stack manufacturing method.
FIG. 1C is a flowchart illustrating in detail the module manufacturing step from the above-described manufacturing method.
Figure 2:
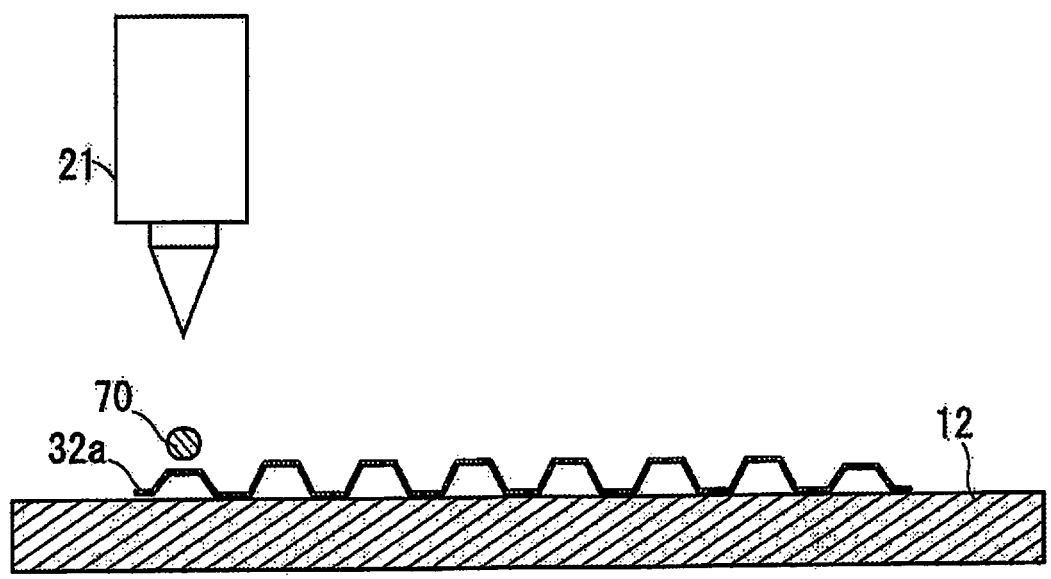
FIG. 2 is an explanatory view illustrating the sealing member layout step in the laminate assembly step according to the first embodiment.
Figure 3:
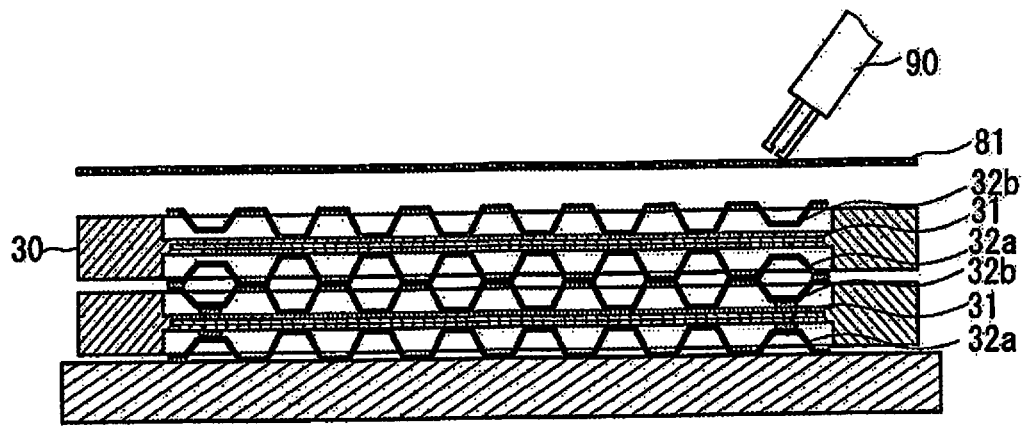
FIG. 3 is an explanatory view illustrating the sealing member layout step in the laminate assembly step according to the first embodiment.
Figure 4:
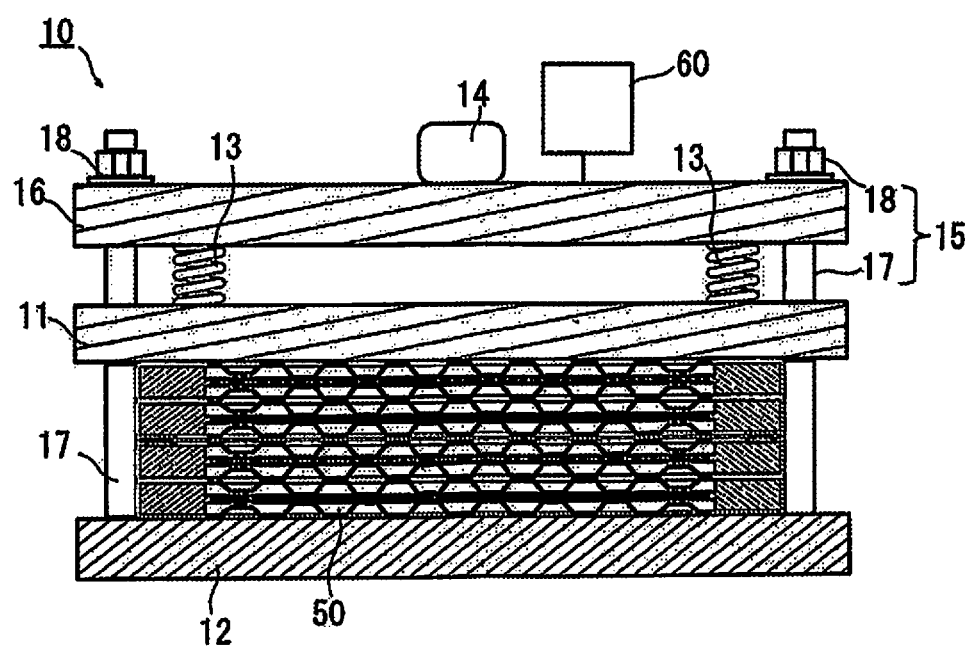
FIG. 4 is an explanatory view illustrating the pressure application step of the laminate.
Figure 5:
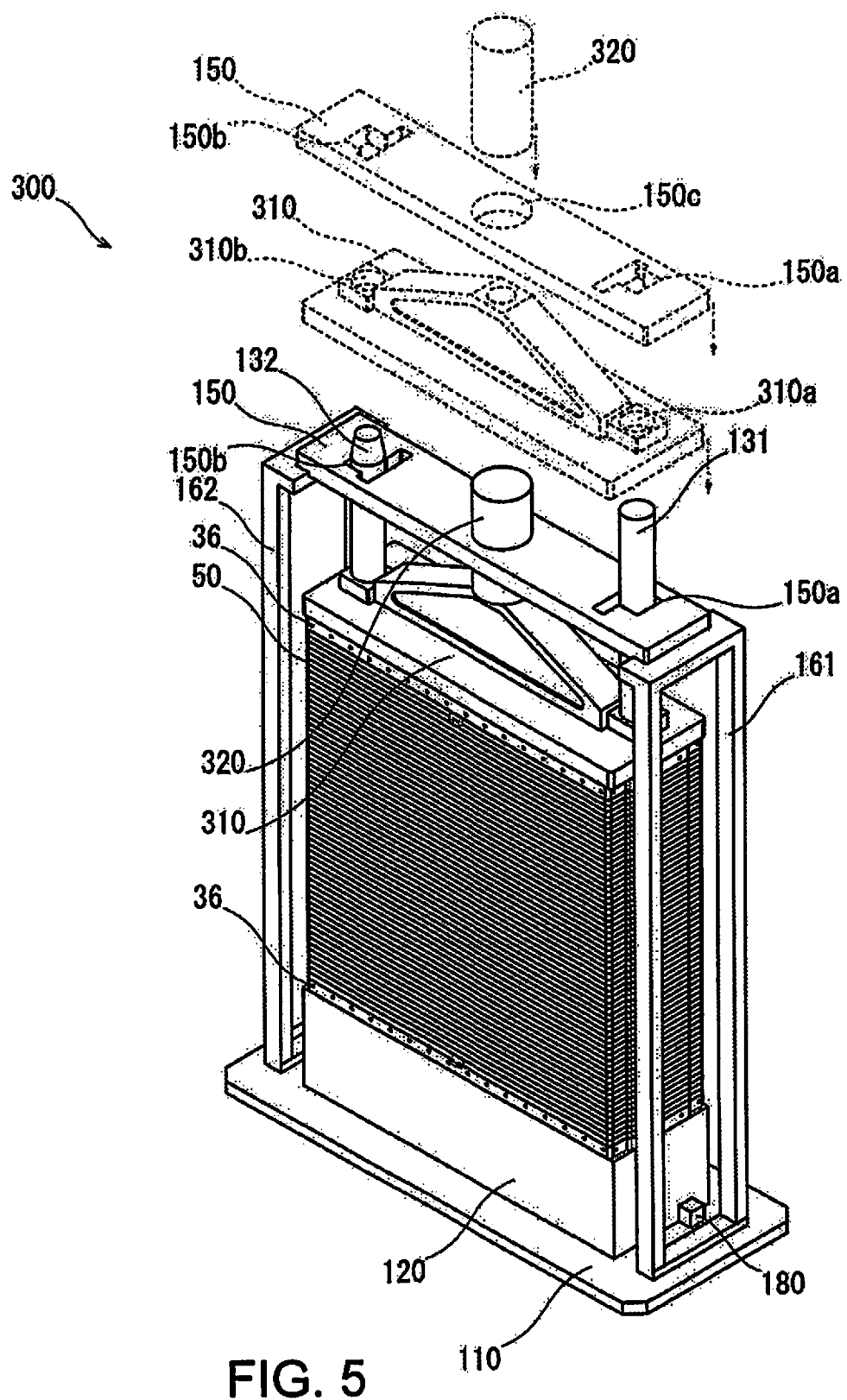
FIG. 5 is an explanatory view illustrating the formation (stacking) of the laminate.
Figure 6:
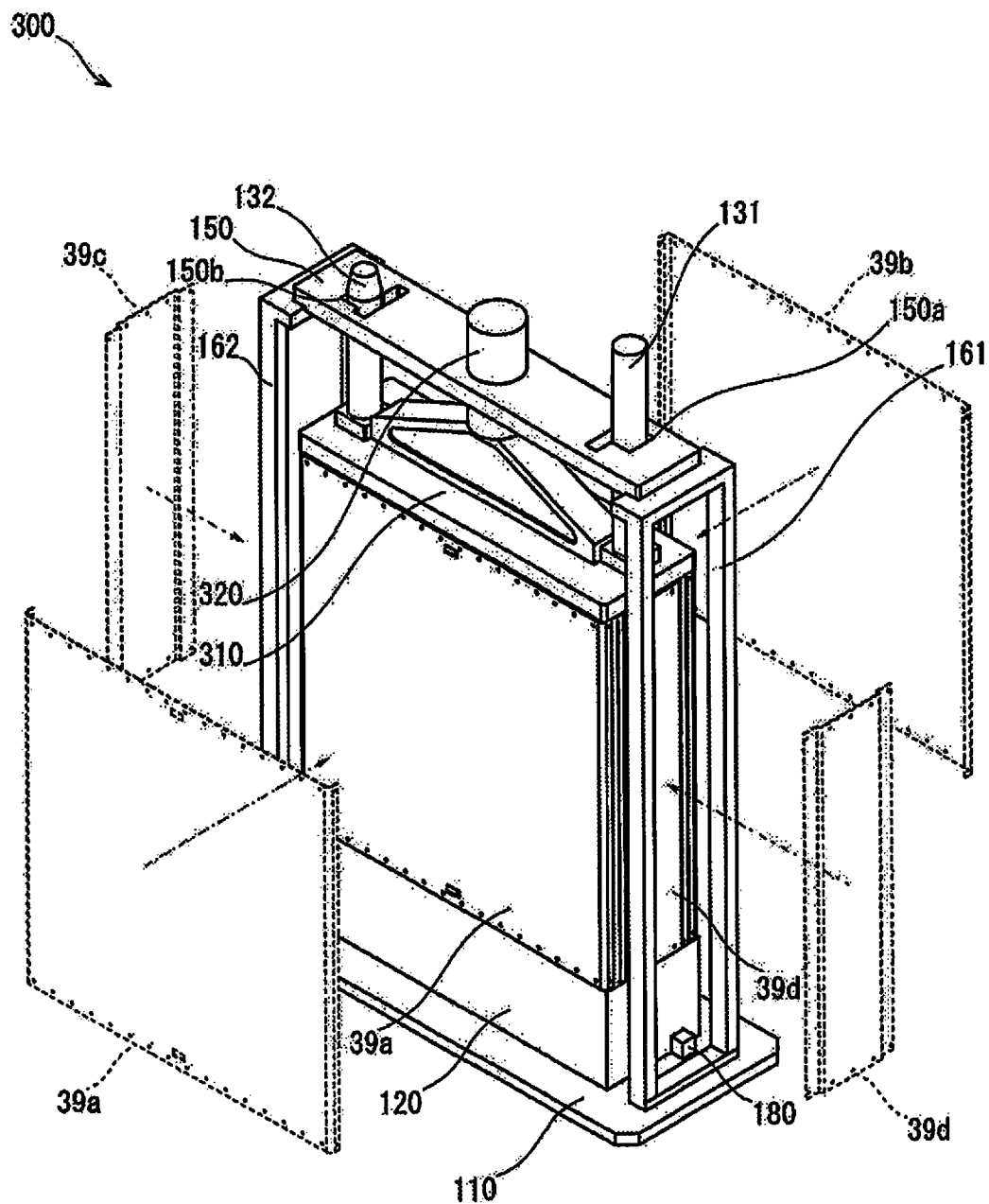
FIG. 6 is an explanatory view illustrating the formation (stacking) of the laminate.

FIG. 1A and FIG. 1B are a time chart and a flowchart, respectively, illustrating the fuel cell stack manufacturing method according to the first embodiment of the present invention; FIG. 1C is a flowchart illustrating in detail the module manufacturing step from the above-described manufacturing method. FIG. 2 and FIG. 3 are explanatory views illustrating the sealing member layout step in the laminate assembly step according to the first embodiment; FIG. 4 is an explanatory view illustrating the pressure application step of the laminate; and FIG. 5 and FIG. 6 are explanatory views illustrating the formation (stacking) of the laminate.

The fuel cell stack manufacturing method according to the present invention generally comprises the manufacturing of the module (refer to the drawings and ST10 in FIG. 1B), comprising a sealing member layout step (refer to FIG. 1A, FIG. 2, and FIG. 3) and the pressure application step (refer to FIG. 1A and FIG. 4); also included is an assembly step (refer to ST30 in FIG. 1B, FIG. 5, and FIG. 6), in which the modules are laminated and fastened to form a stack. The details are described below.

Figure 7:
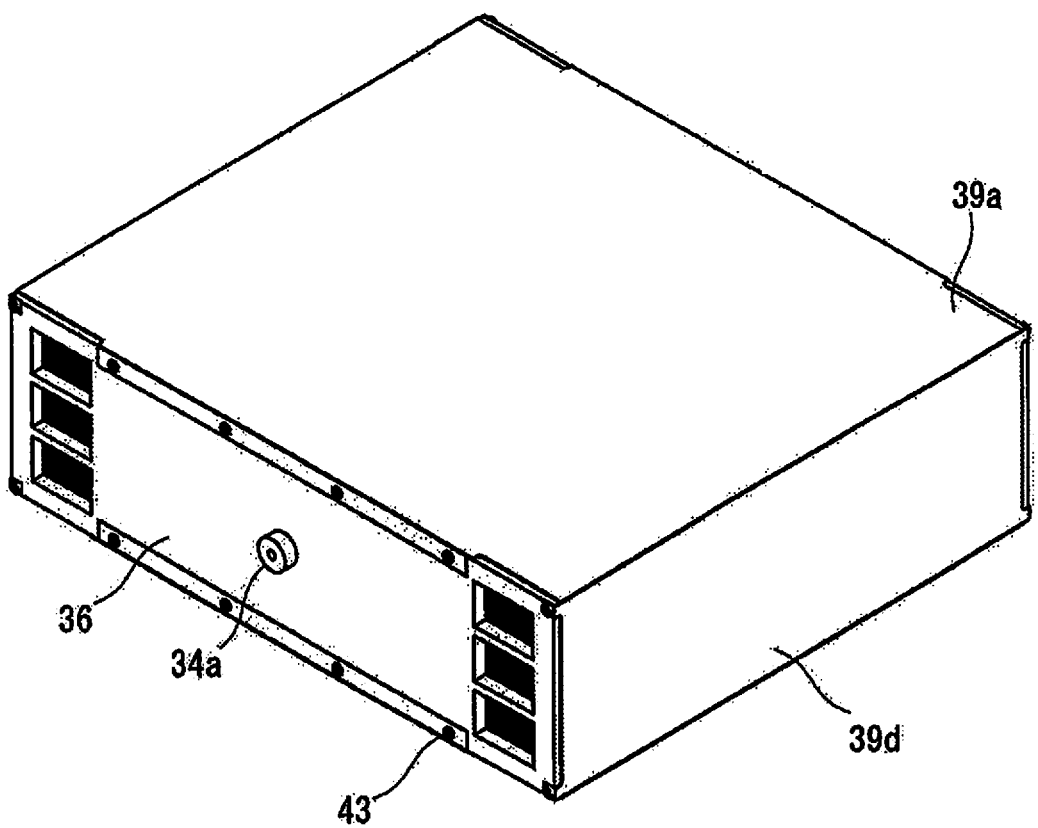
FIG. 7 is a perspective view illustrating the fuel cell stack according to the first embodiment.
Figure 8:
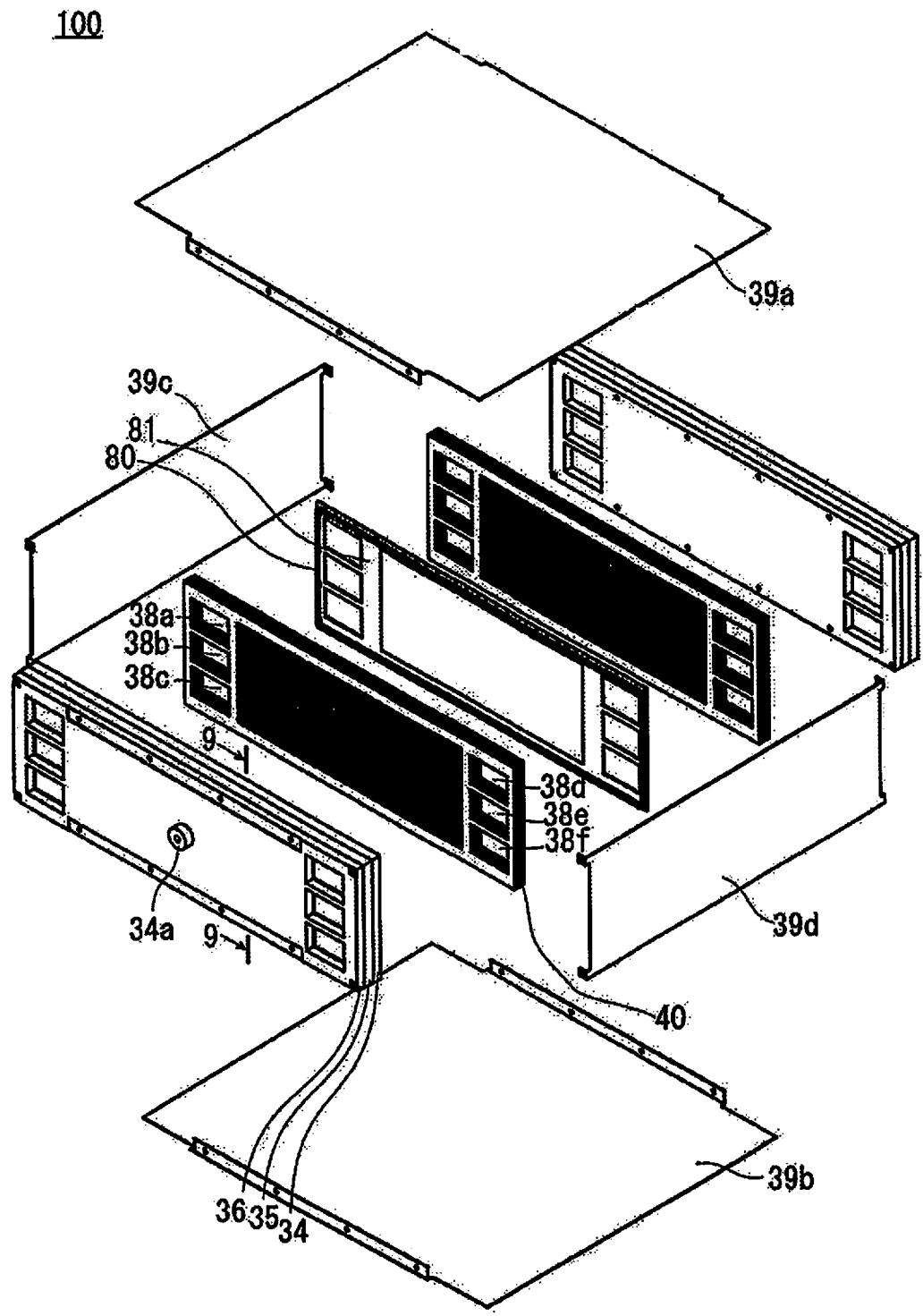
FIG. 8 is an exploded perspective view illustrating the configuration of the fuel cell stack.
Figure 9A:
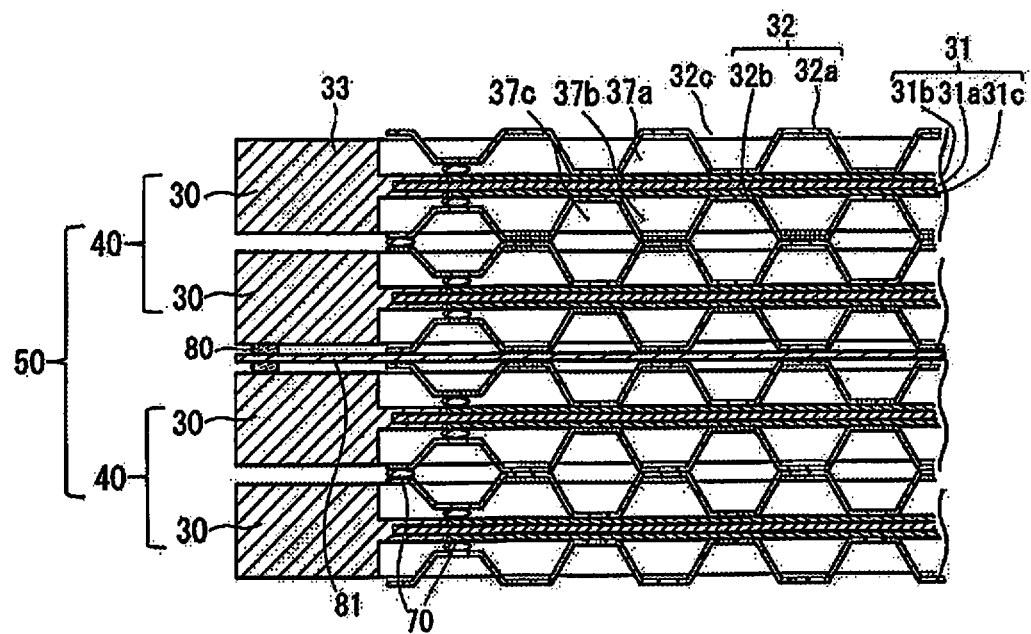
FIG. 9A is a cross-sectional view of the fuel cell stack as seen along the section line 9-9 of FIG. 8, illustrating the cell structure of the fuel cell stack.
Figure 9B:
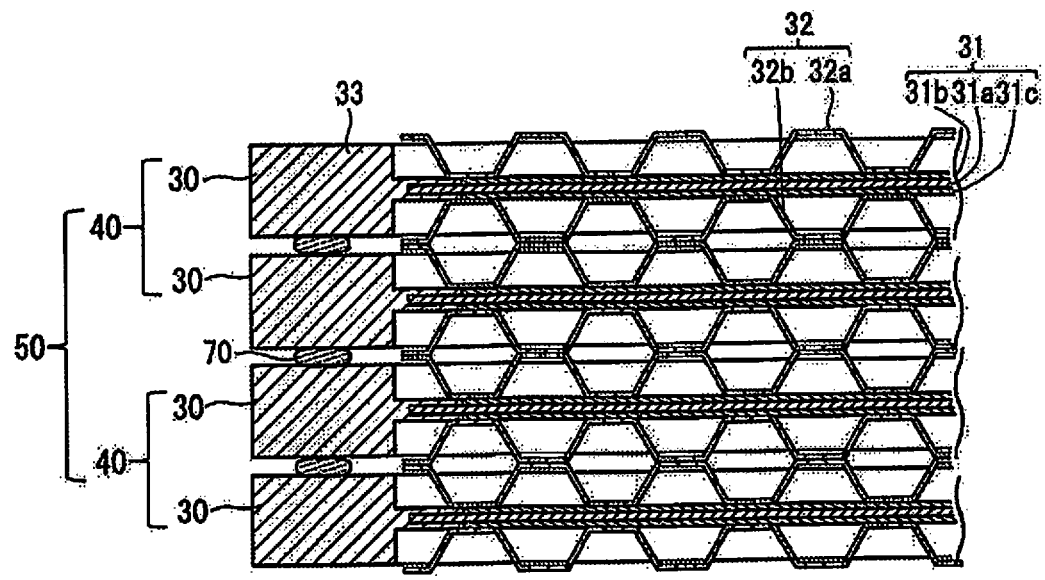
FIG. 9B is a cross-sectional view of the fuel cell stack illustrating a modified example of FIG. 9A.
Figure 10:
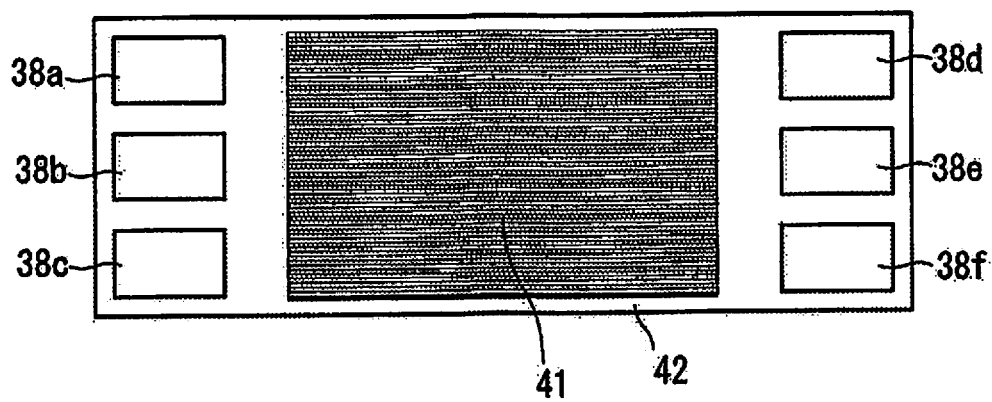
FIG. 10 is a plan view illustrating the fuel cell module.

FIG. 7 is an explanatory view illustrating the fuel cell stack according to the embodiment. FIG. 8 is an exploded perspective view illustrating the configuration of the fuel cell stack. FIG. 9A is a cross-sectional view along the section line 9-9 of FIG. 8, illustrating the cell structure of the fuel cell stack. FIG. 9B is a cross-sectional view illustrating a modified example of FIG. 9A. FIG. 10 is a plan view illustrating the fuel cell module.

The fuel cell stack 100 according to the first embodiment, with reference to FIG. 7-FIG. 10, comprises a fuel cell 30, in which a membrane electrode assembly (hereinafter referred to as an MEA) 31, configured by joining an anode 31b and a cathode 31c on both sides of an electrolyte membrane 31a, is clamped by a pair of separators 32a, 32b. The fuel cell 30 is configured as a fuel cell module 40 by, for example, laminating about eight cells. The fuel cell module 40 is configured as a laminate 50 by laminating two or more thereof. When manufacturing the fuel cell stack 100, the first embodiment relates to a step in which a sealing member 70 is disposed between the MEA 31 and the separator 32a, between the MEA 31 and the separator 32b, and between the separator 32a and the adjacent separator 32b in order to apply a pressing load and to form a seal region. In addition, a sealing member 80 is disposed between the fuel cell modules 40 in a state of being attached to a plate member 81. In the first embodiment, when forming a sealing member by pressing the laminate 50, to which are disposed the sealing members 70, 80, the lamination direction thickness of the laminate 50 is controlled by controlling the load pressing on the laminate 50. The details are described below.

First, the fuel cell stack 100 according to the present embodiment will be described. In the fuel cell stack 100, a predetermined number of unit battery cells (fuel cells) 30, which generate electromotive force via the reaction of an anode gas, such as hydrogen, and a cathode gas, such as oxygen, are laminated to make the fuel cell module 40, and a predetermined number of the fuel cell modules 40 are laminated to form a laminate 50, as illustrated in FIG. 8 and FIG. 9A. However, the laminate 50 is not a necessary configuration and may be configured from one fuel cell module. A collector plate 34, an insulating plate 35, and an end plate 36 are disposed on both ends of the laminate 50.

The fuel cell 30 comprises an MEA 31, separators 32a, 32b, which are respectively disposed on both sides of the MEA 31, and a frame 33, as illustrated in FIG. 9A. Herein below, the separator that is disposed on the anode side of the MEA 31 is referred to as the anode separator 32a, and the separator that is disposed on the cathode side is referred to as the cathode separator 32b.

The MEA 31 comprises a cathode 31c, an anode 31b, and a solid polymer electrolyte membrane 31a, which is a polymer electrolyte membrane that passes, for example, hydrogen ions, as illustrated in FIG. 9A. The MEA 31 is configured to have a laminated structure, in which the solid polymer electrolyte membrane 31a is sandwiched from both sides thereof, by the anode 31b and the cathode 31c. The anode 31b, which comprises an electrode catalyst layer, a watering layer, and a gas diffusion layer, is formed into a thin plate shape. The cathode 31c, which comprises an electrode catalyst layer, a watering layer, and a gas diffusion layer, is formed into a thin plate shape in the same way as the anode 31b. The electrode catalyst layer of the anode 31b and the cathode 31c includes a polymer electrolyte and an electrode catalyst in which the catalyst component is held on a conductive carrier. The gas diffusion layer of the anode 31b and the cathode 31c is formed from, for example, carbon paper, carbon felt, or the like.

The separators 32a, 32b are formed by forming a conductive metal plate with a thin plate thickness into a predetermined shape with a die. The separators 32a, 32b have a waveform shape (a so-called corrugated shape) in which a convex portion and a concave portion are alternately formed in an active area that contributes to power generation (the area of the central portion that is in contact with the MEA) 32c, as illustrated in FIG. 9A.

From the convex/concave shape of the anode separator 32a, an anode gas flow channel 37a for circulating the anode gas is formed in the area of the side that is in contact with the anode 21b. Similarly, from the convex/concave shape of the cathode separator 32b, a cathode gas flow channel 37b is formed in the area of the side that is in contact with the cathode. In addition, the anode separator 32a forms a cooling flow path 37c for a cooling medium, such as cooling water, for cooling the fuel cell module 40 on the surface on the opposite side of the side that is in contact with the anode 31b. Similarly, the cathode separator 32b forms a cooling flow path 37c for a cooling medium, such as cooling water, for cooling the fuel cell module 40 on the surface on the opposite side of the side that is in contact with the cathode 31c.

The frame 33 is a rectangular plate-like member made of a resin or the like having electrical insulating properties. The frame 33 holds the outer periphery of the MEA 31.

The collector plate 34 is joined to both ends of the laminate 50. The collector plate 34 is formed from a conductive member that does not permeate gas, such as dense carbon. A protrusion 34a is formed on the collector plate 34, which is configured so that the power that is collected by the collector plate 34 can be transferred outside.

The insulating plate 35 is formed into a plate shape made of rectangles and is disposed at both ends of the laminate 50 to insulate the collector plate 34.

The end plate 36 is made of, for example, metal, and a pair thereof hold a pair of insulating plates 35 while biasing them from both sides. The separators 32a, 32b, the frame 33, the collector plate 34, the insulating plate 35, the end plate 36, and a plate member 81, which are mentioned below, are formed into a plate shape made of rectangles; a cathode gas inlet 38a, a medium inlet 38b, and an anode gas inlet 38c are formed on one end in the longitudinal direction by through-holes, and an anode gas outlet 38d, a medium outlet 38e, and cathode gas outlet 38f are formed on the other end in the longitudinal direction by through-holes.

The tension plates 39a, 39b are flat plate members that cover the side surface corresponding to the long side of the fuel cell 30, from the side surface of the fuel cell 30 in the lamination direction. Flange portions are provided on both ends of the tension plates 39a, 39b in the lamination direction of the cells, and the fuel cell 30 is pressurized by being fastening to the end plate 36 from both ends with a bolt 43 or the like.

The tension guides 39c, 39d are members with a C-shaped cross section that are attached to the surface that is perpendicular to the tension plates 39a, 39b. The positional displacement of the fuel cell 30 in the horizontal direction is prevented with the tension guides 39c, 39d being attached to the side surface, corresponding to the short side of the fuel cell 30 in FIG. 5 and FIG. 6.

The sealing member 70 is disposed between the MEA 31 and the anode separator 32a, between the MEA 31 and the cathode separator 32b, and between the anode separator 32a and the adjacent cathode separator 32b, as illustrated in FIG. 9A. The material of the sealing member 70 is not particularly limited, and may be, for example, a thermosetting resin.

The plate member 81 is disposed between a fuel cell module 40 and an adjacent fuel cell module 40. A sealing member 80 is provided to the outer peripheral part of both surfaces of the plate member 81. The material of the sealing member 80 is not particularly limited and may be an elastic member such as rubber.

The sealing member 70 seals between the MEA 31 and the anode separator 32a, where fuel flows, between the MEA 31 and the cathode separator 32b, where an oxidizing agent flows, and between the separator 32a and the separator 32b, where the cooling medium flows, inside of the fuel cell module 40. In addition, the cooling medium that flows between fuel cell modules 40 is sealed by the sealing member 80 being disposed between the fuel cell modules 40. The present Specification disposes the sealing member 70 between the MEA 31 and the anode separator 32a and between the MEA 31 and the cathode separator 32b, which configure the fuel cell module 40, and disposes the sealing member 80 between adjacent fuel cell modules 40, corresponding to disposing the sealing member on the outer peripheral part of the end surfaces that face each other between adjacent fuel cells. The position of the sealing member is not limited to FIG. 9A. Fuel, an oxidizing agent, and a cooling medium may be sealed by disposing the sealing member 70 between the frames 33 of the adjacent MEA 31, as illustrated in FIG. 9B. This is because the fuel, the oxidizing agent, and the cooling medium that flow inside of the fuel cell module can be sealed, even if the sealing member 70 is disposed as shown in FIG. 9B.

Figure 11:
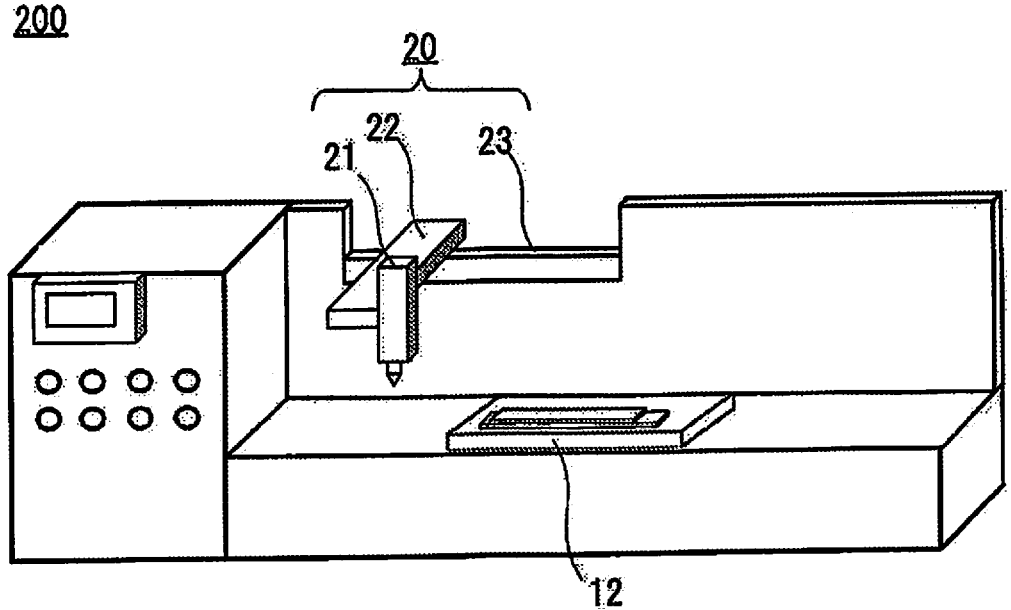
FIG. 11 is a schematic perspective view, illustrating the assembly device of the laminate that configures the fuel cell stack.
Figure 12:
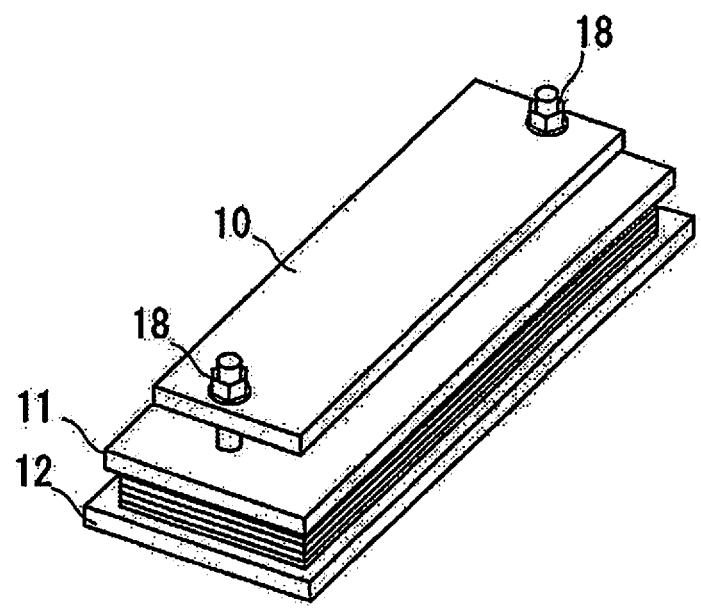
FIG. 12 is a perspective view illustrating a state in which the laminate that configures the cell stack is clamped by a jig.
Figure 13:
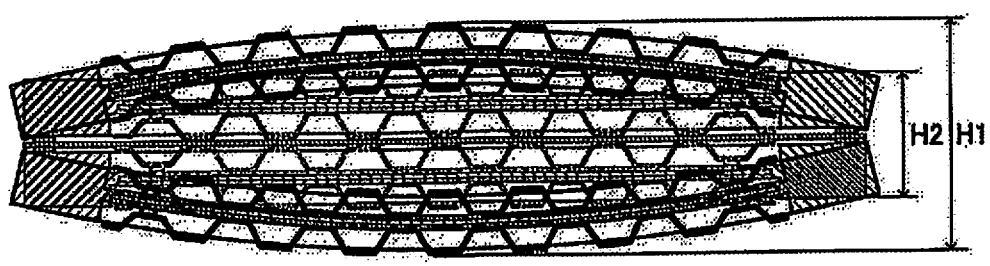
FIG. 13 is an explanatory view illustrating a case in which the fuel cell module is pressed and a case in which the fuel cell module is not pressed by the pressure application unit.
Figure 14:
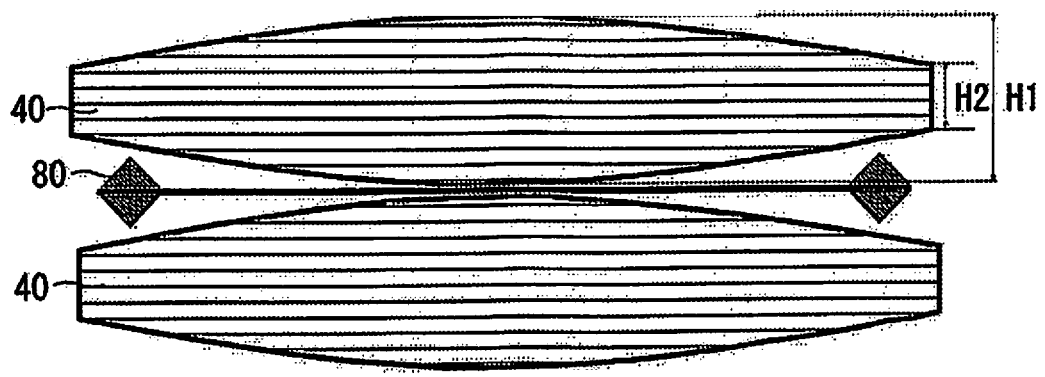
FIG. 14 is an explanatory view showing the formation of the seal region by the pressing via the fuel cell module.
Figure 15:
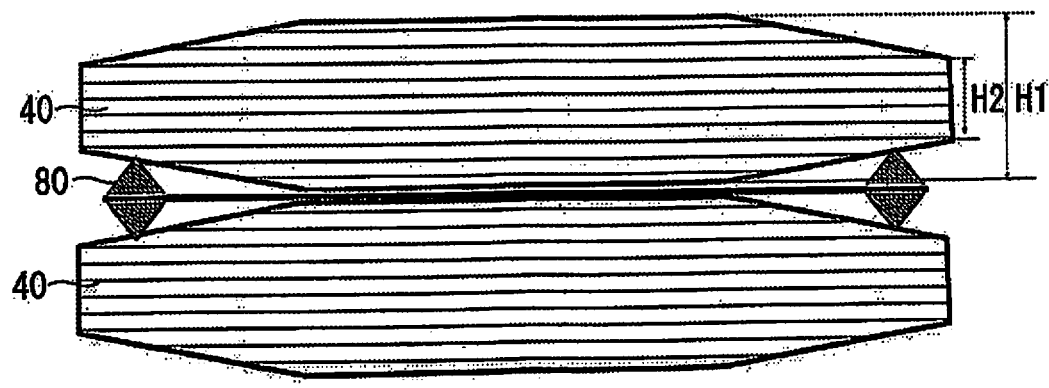
FIG. 15 is an explanatory view showing the formation of the seal region by the pressing via the fuel cell module.

Next, the laminate assembly device in which a plurality of fuel cell modules according to the present embodiment are laminated will be described. The laminate assembly device 200 and the mounting device 300 according to the first embodiment are a part of the manufacturing device of the fuel cell stack; since the other device configurations in the manufacturing device of the fuel cell stack are well known, the explanations thereof are omitted. FIG. 11 is a schematic perspective view, illustrating the laminate assembly device according to the first embodiment; FIG. 12 is a perspective view illustrating a state in which the fuel cell module is clamped by a jig. FIG. 13 is an explanatory view illustrating a case in which the laminate is pressed and a case in which the laminate is not pressed by the pressure application unit. FIG. 14 and FIG. 15 are explanatory views showing the formation of the seal region by the pressing via the fuel cell module.

The assembly device 200 of the laminate 50 comprises a coating unit 20 for coating the sealing member 70 (corresponding to the sealing member layout unit); a lamination unit 90 that forms the fuel cell module 40 and the laminate 50 by laminating an MEA 31; separators 32a, 32b and a plate member 81; a pressure application unit 10 that presses the fuel cell module 40 from the lamination direction of the fuel cell 30, in the fuel cell module 40; and a control unit 60 that controls the operation of at least the pressure application unit 10 (refer to FIG. 2-FIG. 4 and FIG. 11).

The pressure application unit 10 comprises a pressing jig 11 that presses the laminate 50 by approaching and separating in the lamination direction of the laminate 50, as well as a receiving jig 12 that receives the laminate 50 that has been pressed by the pressing jig 11 by setting the laminate 50 thereon. In addition, the pressure application unit 10 comprises an elastic member 13 that is connected to the pressing jig 11 (corresponding to the buffer member), a detection unit 14 for detecting the pressing load that the pressing jig 11 applies, a retaining unit 15 for retaining the state in which the laminate 50 is pressed by the pressing jig 11 and the receiving jig 12, and a pressing member 16.

The pressing jig 11 approaches and separates from the receiving jig 12 in conjunction with the movement of the pressing member 16, which generates a force to move the pressing jig 11 toward the receiving jig 12. The pressing jig 11 has a sufficiently larger area than the area of the laminate 50 when viewing the laminate 50 in plain view; in the first embodiment, the pressing surface is formed to be flat.

The MEA 31 and the separators 32a, 32b are set on the receiving jig 12, whose placement surface is formed to be flat and which is formed to have an area that is the same as the pressing surface of the pressing jig 11. In addition, insertion holes for inserting connecting bolts 17, which position the pressing jig 11 and the receiving jig 12, are formed on the four corners of the pressing jig 11 and the receiving jig 12.

The retaining unit 15 comprises connecting bolts 17 that are inserted in the insertion holes that are provided to the pressing jig 11 and the receiving jig 12 and connect the pressing jig 11 and the receiving jig 12, along with nuts 18 that are fastened to the threaded portions of the connecting bolts 17. The pressing jig 11 and the receiving jig 12 are positioned by fastening the nut 18 to the connecting bolt 17, and the adjustment of the gap and the retention of the gap between the pressing jig 11 and the receiving jig 12 are carried out.

The elastic member 13 prevents cracks from forming on the laminate 50 due to an excessive force being applied abruptly to the laminate 50, when pressing the laminate 50 with a predetermined load. In addition, if there is a temperature change when curing by applying the sealing member 70, the sealing member 70 causes shrinkage, etc., and the load that is applied to the laminate 50 fluctuates; however, by providing the elastic member 13, the change in the load of the sealing member 70 due to a temperature change is released, and preventing the generation of flaws, etc., on the laminate 50 due to stress concentration is possible.

Figure 17:
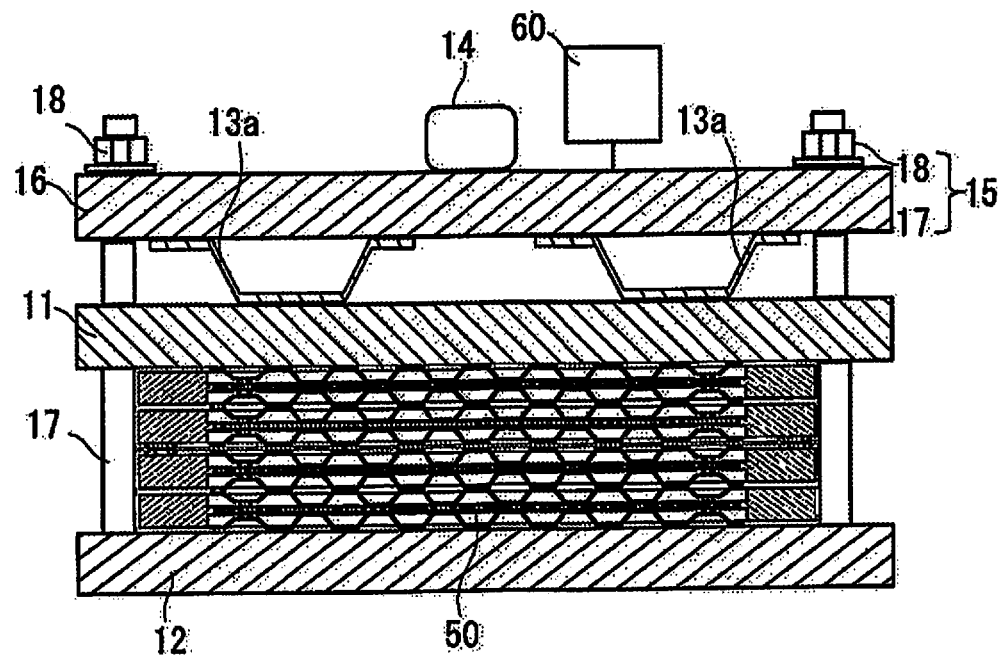
FIG. 17 is an explanatory view illustrating a modified example of a jig structure in the laminate assembly device.

FIG. 17 is an explanatory view illustrating a modified example of a jig structure in the laminate assembly device according to the first embodiment. In the first embodiment, the elastic member 13 is configured by a coil spring, as illustrated in FIG. 4, etc.; however, other than the above, the elastic member may also be configured by a plate spring 13a, as illustrated in FIG. 15. By using a configuration such as a coil spring or a plate spring, forming the seal region by the sealing members 70, 80 with a simple configuration, without damaging the laminate 50, becomes possible.

The detection unit 14 is a member for detecting the pressing load with which the pressing jig 11 presses the laminate 50; while a, a load cell is used in the present embodiment, the embodiment is not limited thereto.

In addition, the separators 32a, 32b that configure the MEA 31 in the fuel cell 30 have the uneven, so-called corrugated shape 32c, as described above. Since the central portion 41 of the fuel cell module illustrated in FIG. 10, in which the fuel cells 30 are laminated, corresponds to the power generation portion, the sealing member 70 cannot be applied thereto, and the sealing member 70 is applied only on the outer peripheral part 42. Accordingly, if load is applied upon curing the sealing member 70, stress is likely to be concentrated at the boundary of the outer peripheral part 42 to which the sealing member 70 is applied and the central portion 41 to which the sealing member 70 is not applied. In contrast, by providing a corrugated shape 32c to the central portion 41, which is the power generation portion, the load is absorbed by the corrugated shape 32c in the same way as the elastic member 13; damage to the laminate 50 is prevented by preventing stress from being concentrated at the boundary of the central portion 41 and the outer peripheral part 42; and managing the thickness of the laminate 50 by the pressing load becomes possible.

The coating unit 20 comprises an applicator 21, an arm 22 for moving the applicator 21 in a set direction, and a rail 23 for moving the arm 22 in a direction that intersects the direction in which the applicator 21 moves.

An example of an applicator 21 is, for example, a gun-shaped, injection-type one; however, the applicator is not limited thereto. The arm 22 positions the applicator 21 to predetermined positions of the MEA 31 and the separators 32a, 32b, which configure the laminate 50, by movably attaching the applicator 21 and moving the applicator 21. The movement of the applicator 21 can be realized by, for example, providing rotatable rollers to the applicator 21 and by providing an arm rail to the arm 22, which becomes a path for the rollers of the applicator 21; however, the configuration is not limited thereto.

The rail 23 is, for example, installed on the sidewall of the assembly device 200 and is disposed in a direction that is different from the movement direction of the applicator 21 to be a path that allows for the movement of the arm 22. Accordingly, if the applicator 21 and the arm 22 are moved; the applicator 21 can be disposed in a predetermined position of the MEA 31 or the separators 32a, 32b, by combining the movement direction of the applicator 21 and the movement direction of the arm 22; and the sealing member 70 can be applied. The movement of the arm 22 can be realized by providing a rotatable arm roller to the arm 22 and having the arm roller move the rail 23; however, the configuration is not limited thereto.

The lamination unit 90 is configured from the MEA 31 and the separators 32a, 32b, which configure the laminate 50, and a hand robot on which the plate member 81 is set, as illustrated in FIG. 3. Besides the above, the lamination work may be performed, for example, manually.

The control unit 60 is configured from a CPU, a RAM, a ROM, and an I/O interface, etc., and this unit controls the operation of the pressure application unit 10, the coating unit 20, and the lamination unit 50; however, this unit may also be configured to control only the operation of the pressure application unit 10.

The assembly device 300, which forms the laminate, comprises a supporting platform 110, a reference table 120 (corresponding to the clamping member), pillars 131, 132, a pillar spacing adjustment jig 150, reference side pillars 161, 162, a control unit 180, a load application member 310 (corresponding to the clamping member), and a pressing member 320 (corresponding to the clamping member). The reference table 120 is placed on the supporting platform 110; constituent components of the fuel cell stack, such as the fuel cell module 40 and the plate member 81, are stacked on the reference table 120. The stacked constituent components of the fuel cell stack are positioned and aligned with the pillars 131, 132 being inserted in the positions of the medium inlet or the medium outlet. The pillar spacing adjustment jig 150 is placed on the reference side pillars

161, 162. The pillar spacing adjustment jig 150 adjusts the gap between the pillar 131 and the pillar 132. The load application member 310 and the pressing member 320 are controlled by the control unit 180, clamping the constituent components of the fuel cell stack along with the reference table 120, in a state in which the laminate 50, the collector plate 34, the insulating plate 35, and the end plate 36 are stacked; thus, the pressing load is applied. In this state, the fuel cell stack is completed by attaching and bolt-fastening the tension plates 39*a*, 39*b* and the tension guides 39*c*, 39*d*.

Next, the laminate assembly method according to the present embodiment will be described. The laminate assembly step according to the first embodiment comprises a sealing member layout step, in which the sealing member 70 is applied to the outer peripheral part 42 of the separator 32*a*, which configures the laminate 50, the MEA 31 is stacked, the separator 32*b* is stacked, the sealing member 70 is applied to form the fuel cell 30, a plurality of fuel cells 30 are laminated to form the fuel cell module 40, and the sealing member 80 is disposed between the fuel cell modules 40 to form the laminate 50; and a pressure application step, in which the laminate 50 is pressed from the lamination direction of the cells 30 by the pressure application unit 10. In the first embodiment, an example is described in which the fuel cell module 40 is configured from two fuel cells 30 and the laminate 50 is configured from two fuel cell modules 40; however, the above is only one example, and the invention is not limited thereto.

When manufacturing the module (step ST10 in FIG. 1B), in the sealing member layout step, first, the MEA 31 or the separators 32*a*, 32*b* that configure the fuel cell module 30 are set on the receiving jig 12 in the assembly device 200, as illustrated in FIG. 2; the sealing member 70 is disposed on the separator 32*a* via a coating on the upper surface of the placed member (step ST11 in FIG. 1(C)). In the first embodiment, an anode separator 32*a* is placed thereon as one example.

Next, the MEA 31 on which the sealing member 70 is disposed by the coating unit 20 is set on the separator 32*a*, and a cathode separator 32*b* on which the sealing member 70 is disposed is set on the MEA 31 (step ST12 in FIG. 1(C)). The fuel cell 30 is thereby formed. When one more fuel cell 30 is formed in the same way, the parts that configure the fuel cell module 40 are stacked.

In this state, structures, such as the pressing jig 11, the elastic member 13, the detection unit 14, the retaining unit 15, and the pressing member 16, are disposed, and the pressing load is applied (step ST13 in FIG. 1(C)). The applied load is adjusted unless the applied load is within ±10% of the target value F (step ST14 in FIG. 1(C): NO). If the applied load is within F±10% (step ST14 in FIG. 1(C): YES), the nut 18 is fastened on the connecting bolt 17 to fix the thickness of the fuel cell module 40 to cure the sealing member 70 (step ST15 in FIG. 1(C)). The value off 10% is an example, and this may be set to be another value. The fuel cell module 40 is completed with the step described above. When completed, the fuel cell module 40 is removed from the assembly device 200.

In the next step, a leak test and an insulation and resistance test are performed (step ST20 in FIG. 1B) in order to check if the module has any problems. If there is a problem in the test (step ST20 in FIG. 1B: NO), the manufacturing of the module is performed again (step ST10 in FIG. 1B). If there is no problem (step ST20 in FIG. 1B: YES), the operation proceeds to the manufacturing of the laminate (stack) 50. In the manufacturing of the laminate, the end plate 36, the insulating plate 35, the collector plate 34, and the fuel cell module 40 are set on the pillars 131, 132 of the assembly device 300, and a plate member 81, on both sides of which is applied the sealing member 80, is stacked on the fuel cell module 40. In the present embodiment, two fuel cells 30 are laminated, and two fuel cell modules 40 are prepared.

When two fuel cell modules 40 are stacked, the collector plate 34, the insulating plate 35, and the end plate 36 are set thereon. Then, the tension plates 39*a*, 39*b* and the tension guides 39*c*, 39*d*, which configure the chassis, are attached and fastened with the bolt 43 (step ST30 in FIG. 1B). Then, a leak test and a checking of the power generation performance as a laminate 50 are performed; if there is a problem (step ST40 in FIG. 1B: NO), the load application on the laminate, etc., are performed again (step ST30 in FIG. 1B). If there is no problem in the performance of the laminate 50 (step ST40 in FIG. 1B: YES), the laminate is shipped.

Figure 16:
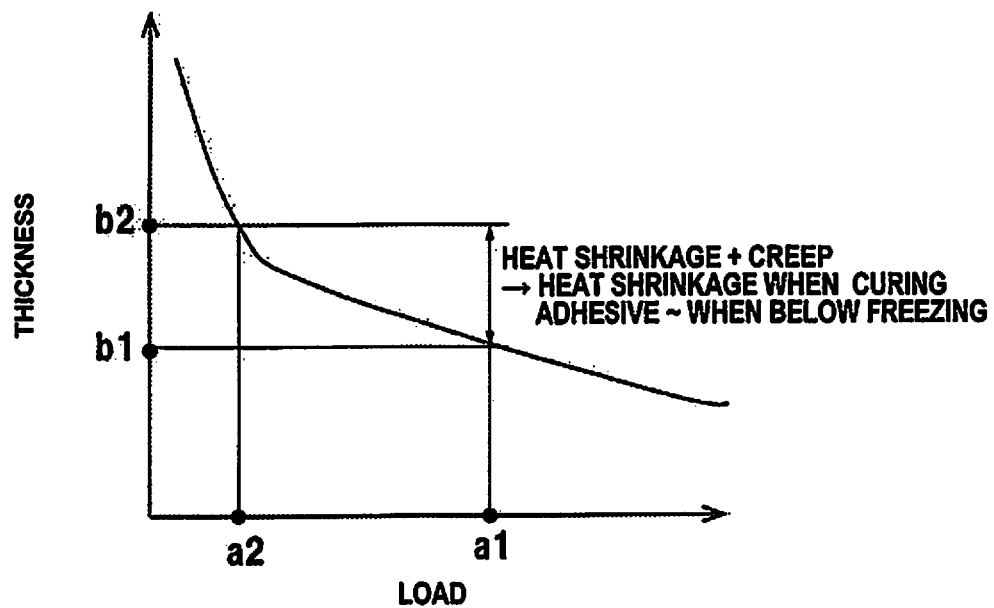
FIG. 16 is a graph illustrating the relationship between the load that is applied to the laminate and the thickness of the laminate.

The load when curing the sealing member that is applied to the fuel cell module will be described here. FIG. 16 is an explanatory view illustrating the relationship between the load that is applied to the laminate and the thickness of the laminate in the lamination direction. As can be seen from FIG. 16, the thickness of the laminate 50 decreases as the load that is applied to the laminate 50 increases.

In addition, as described above, since power generation is performed in the central portion 41, the sealing member 70 cannot be applied to the central portion 41, and the sealing member 70 is applied only to the outer peripheral part 42.

Since the application site of the sealing member 70 is limited to the outer peripheral part 42 in this way, when the pressure from the pressing jig 11 is released, a phenomenon occurs in which a difference in the thicknesses is generated, such as the thickness of the central portion 41 of the fuel cell module 40 being H1 and the thickness of the outer peripheral part 42 being H2, as illustrated in FIG. 13-FIG. 15. In view of such a phenomenon, the load that is applied when curing the sealing member 70 by pressing the laminate 50 (hereinafter referred to as the curing load of the sealing member 70) must be equal to or less than the clamping pressure load when, for example, mounting the end plate 36 to the laminate 50 and clamping from both sides.

When the curing load of the sealing member 70 is greater than the clamping pressure load from the end plate 36 (when a1 in FIG. 16 is the curing load of the sealing member 70 and a2 is the clamping pressure (mounting) load when stacking), the central portion 41 cannot be crushed to the thickness of the outer peripheral part, to which is coated the sealing member 70 when stacking; additionally, the difference between the thickness of the central portion 41 (b1 in FIG. 12) and the thickness of the outer peripheral part 42 (b2 in FIG. 12) cannot be eliminated.

By making the curing load of the sealing member 70 equal to or less than the clamping pressure load from the end plate 36, the outer peripheral part 42 being excessively crushed is prevented, a difference occurring between the central portion 41 and the outer peripheral part 42 is prevented when stacking, and reliably forming the seal region becomes possible.

In addition, the curing load of the sealing member 70 may be configured to be equal to or less than the minimum load in an environment in which the fuel cell stack 100 is used (at the time of non-power generation); in addition, this load may be equal to or less than the clamping pressure load from the end plate 36. When using the fuel cell stack 100, fuel, the oxidizing agent, and cooling water are supplied inside the fuel cell stack 100; as a result, the fuel cell stack 100 expands more than when mounting and clamping the end plate 36. That is, the minimum load in an environment in which the fuel cell stack 100 is used will be smaller than the load when clamping, as described above. The seal member 70 must form a seal region in an environment in which the fuel cell stack 100 is used; therefore, even if the curing load of the sealing member 70 is configured to be equal to or less than the minimum load in the use environment, a seal region can be reliably formed by preventing the occurrence of a difference between the thicknesses of the central portion 41 and the outer peripheral part 42 in the module 40.

Furthermore, besides the above, the curing load of the sealing member 70 may be configured to be equal to or less than the minimum load at which the separators 32a, 32b come in contact with the MEA 31, in the power generation portion 41. In order for the fuel cell stack 100 to generate power, at least the separators 32a, 32b must be put in contact with the MEA 31 so that space for the fuel and the oxidizing agent to flow is formed on both sides of the MEA 31 by the separators 32a, 32b. The minimum load with which the separators 32a, 32b come in contact with the MEA 31 is equal to or less than the clamping pressure load described above and is equal to or less than the minimum load in an environment in which the fuel cell stack is used; however, this can cause the fuel cell stack to generate power. Accordingly, securing the power generation of the fuel cell stack and reliably forming the seal region are also possible by configuring the curing load of the sealing member 70 to be equal to or less than the minimum load at which the separators 32a, 32b come in contact with the MEA 31.

The action and effect of the invention according to the first embodiment will be described next.

When disposing the sealing members 70, 80 on the laminate 50, in order to seal the fuel, the oxidizing agent, etc., the sealing members 70, 80 are disposed on the outer peripheral part 42 since disposing them on the central portion 41, which is the power generation portion, is not possible. A seal region is not formed if the sealing members 70, 80 (especially the sealing member 80) are not sufficiently crushed, and the sealing member is not sufficiently crushed if there is a difference between the thicknesses of the central portion 41 and the outer peripheral part 42. Accordingly, when assembling the fuel cell stack 100 by laminating the fuel cells 30, the difference in the thicknesses between the central portion 41 and the outer peripheral part 42 must be eliminated so that a seal region is formed. However, for example, even if the gap between the MEA 31 and the separators 32a, 32 is adjusted using a spacer or the like, there are cases in which the difference in the thicknesses between the central portion 41 and the outer peripheral part 42 cannot be eliminated due to variability.

In contrast, the first embodiment is configured to control the thickness of the laminate 50 by controlling, not the thickness of the laminate 50, but the pressing load for pressing the laminate 50, when pressing the laminate 50 with the pressure application unit 10. Accordingly, in the first embodiment, variation in the thickness of the laminate 50, etc. when assembling the fuel cell stack 100 can be considered, the laminate 50 can be pressed so that a difference in the thicknesses between the central portion 41 and the outer peripheral part 42 is not generated, and the sealing property can be improved by securing the compression amount of the sealing member.

In addition, the pressing load, when curing the sealing member 70 by pressing the laminate 50 in the pressure application step, is configured to be equal to or less than the clamping pressure load for clamping the laminate 50 with the load application member 310 and the pressing member 320, when assembling the fuel cell stack 100. Accordingly, if the laminate 50 is clamped from both ends by the end plate 36 when forming the fuel cell stack 100, the central portion 41 can be crushed to the thickness of the outer peripheral part 42, and a seal region can be reliably formed by making the thickness of the laminate 50 uniform.

In addition, the pressing load, when curing the sealing member 70 by pressing the laminate 50 in the pressure application step, may be configured to be equal to or less than the minimum load in an environment in which the fuel cell stack 100 is used (at the time of non-power generation). Since the minimum load in the use environment is equal to or less than the clamping pressure load from the end plate 36, the central portion 41 can be crushed to the thickness of the outer peripheral part 42 at the time of assembling the fuel cell stack and in an environment in which the fuel cell stack is used in the same way as described above; as a result, reliably forming the seal member becomes possible.

In addition, the pressing load, when curing the sealing member 70 by pressing the laminate 50 in the pressure application step, may be configured to be equal to or less than the minimum load at which the separators 32a, 32b come in contact with the MEA 31. The minimum load at which the separators 32a, 32b come in contact with the MEA 31 is equal to or less than the load at the time of clamping by the end plate 36 and in an environment in which the fuel cell stack is used. Accordingly, by configuring the above-described pressing load to be equal to or less than the minimum load at which the separators 32a, 32b come in contact with the MEA 31, securing the power generation of the fuel cell stack 100 while reliably forming the seal region by crushing the central portion 41 to the thickness of the outer peripheral part 42 is possible, even when assembling the fuel cell stack and in an environment in which the fuel cell stack 100 is used.

In addition, the embodiment is configured so that, when applying the pressing load with the pressing jig 11, the pressing load is monitored by a detection unit 14 consisting of a load cell, etc., and so that a state in which the laminate 50 is pressed is retained by the retaining unit 15. Accordingly, an excessive pressing load being applied to the laminate 50 can be reliably prevented, a difference occurring between the central portion 41 and the outer peripheral part 42 is prevented, and reliably forming the seal region becomes possible.

Additionally, if a state is maintained in which the laminate 50 is pressed along with the retaining unit 15, using an elastic member 13 comprising a plate spring 13a, etc., for the pressing jig 11, the load fluctuation can be released even when a load fluctuation to the laminate 50 is generated due to a temperature change when curing the sealing member 70. Therefore, scratches, etc. being generated due to an occurrence of a concentration of stress on the laminate 50 can be prevented.

In addition, the uneven, so-called corrugated shape 32c, which is formed on the separators 32a, 32b, may function as an elastic member, such as a plate spring. Accordingly, damage to the laminate 50 is prevented by preventing stress from concentrating at the boundary of the central portion 41 and the outer peripheral part 42 even when applying the pressing load for curing the sealing member 70; as a result, managing of the thickness of the laminate 50 via the pressing load becomes possible.

Second Embodiment

Figure 18:
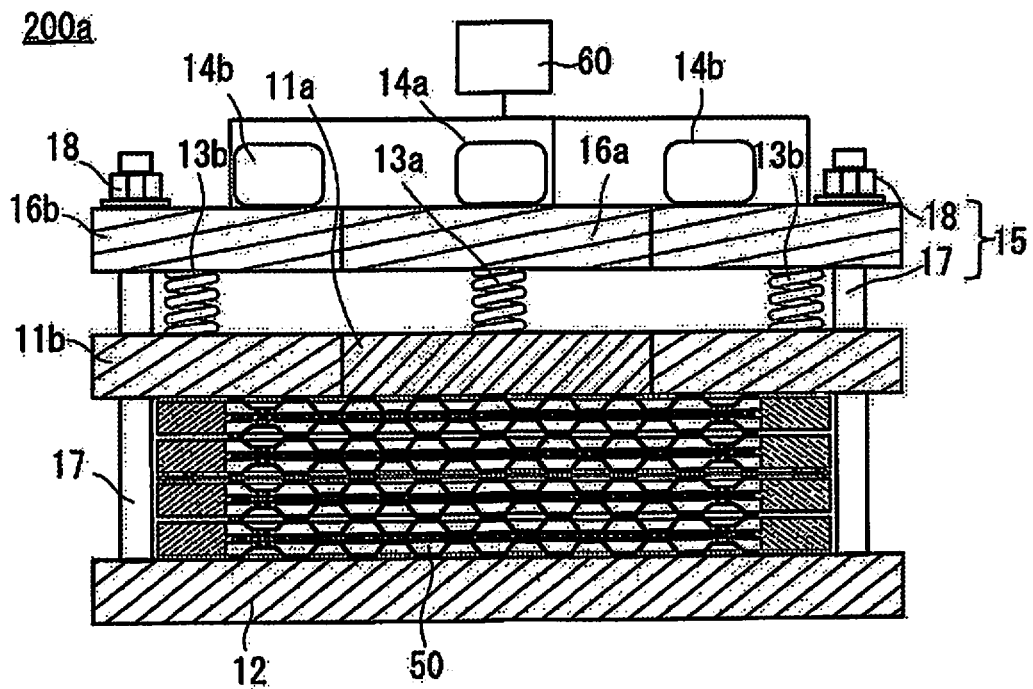
FIG. 18 is an explanatory view illustrating the jig structure in the fuel cell module assembly device according to a second embodiment of the present invention.

FIG. 18 is a cross-sectional view illustrating the jig structure in the laminate assembly device according to the second embodiment. In the first embodiment, the laminate 50 was pressed by a single jig, the pressing jig 11, but the invention may also be configured as follows.

In the fuel cell stack assembly device 200a of the second embodiment, the pressing jig is configured from a pressing jig 11a that presses the central portion 41, corresponding to the power generation portion in the laminate 50, and an annular pressing jig 11b that presses an outer portion 42 that is outward of the central portion 41, as illustrated in FIG. 18. The load that is applied by the pressing jig 11a and the load that is applied by the pressing jig 11b may be made different loads by adjusting the spring constant of the elastic member 13b and the elastic member 13c, which are connected to the pressing member 16. The other configurations of the assembly device 200a are the same as those in the first embodiment, aside from the detection units 14a, 14b for respectively detecting the pressing weight of the pressing jigs 11a, 11b; therefore, the descriptions thereof are omitted.

The assembly device 200a of the laminate 50 according to the second embodiment is configured so that the loads that are applied to the central portion 41 and the outer portion 42 in the laminate 50 are applied separately. Accordingly, even if the variation in the thickness dimension in the planar direction of the laminate 50 is greater, the difference in the thicknesses of the central portion 41 and the outer peripheral part 42 is more easily eliminated by being able to separately press the central portion 41 and the outer peripheral part 42; as a result, reliably forming the seal region becomes possible.

Third Embodiment

Figure 19:
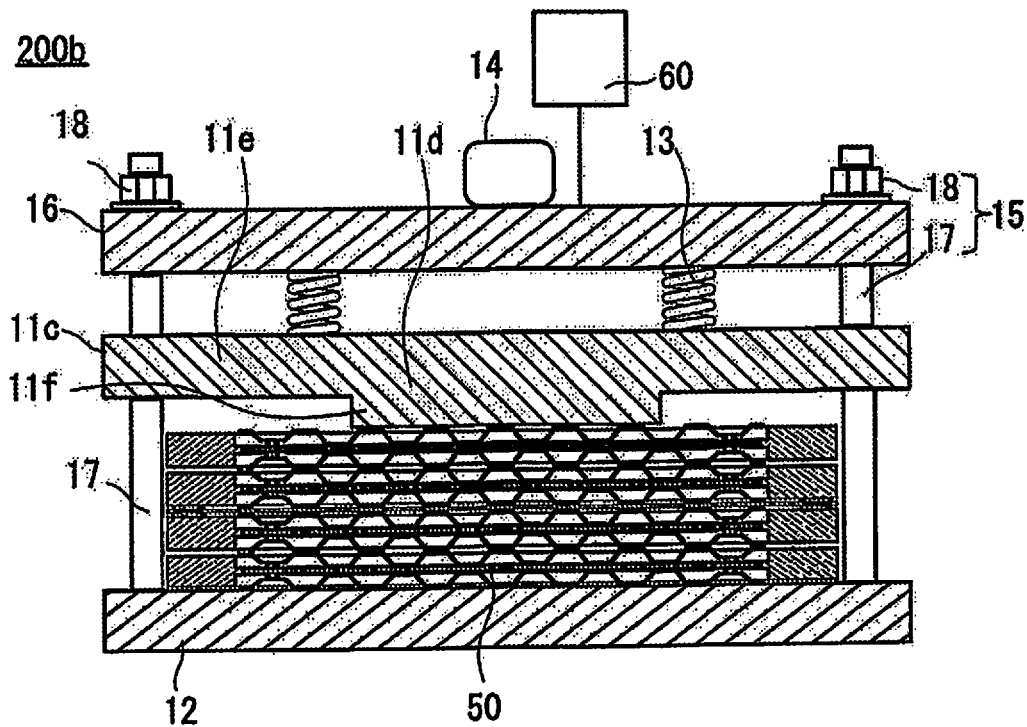
FIG. 19 is an explanatory view illustrating the jig structure in the laminate assembly device according to a third embodiment of the present invention.

FIG. 19 is an explanatory view illustrating the jig structure in the laminate assembly device according to the third embodiment. In the first embodiment, a pressing jig 11 in which the pressing surface that presses the laminate 50 is flat was used to press the laminate 50 and to cure the sealing member 70; however, the pressing jig may also be configured as follows.

The pressing jig 11c that configures the assembly device 200b of the fuel cell module in the third embodiment has a pressing surface for pressing the laminate 50 that is not flat and comprises a power generation portion pressing portion 11d for pressing the central portion 41, corresponding to the power generation portion, and an outer pressing portion 11e for pressing the outer side of the power generation portion pressing portion 11d. Since use in cold regions must be guaranteed for automobiles equipped with the fuel cell stack 100, forming a seal region with the sealing member 70 must be considered for the laminate 50 even when cold. In contrast, in the assembly device 200b of the laminate 50 according to the third embodiment, the pressing jig 31c is configured so that the power generation portion pressing portion 11d comprises a step 11f in the lamination direction, with respect to the outer portion pressing portion 11e. The height of the step 11f in FIG. 17 may be the heat-shrinkage amount of the sealing member 70 within a guaranteed temperature; however, this is not limited thereto.

By providing a step 11f to the pressing jig 11c with consideration for shrinkage or the like due to the temperature change of the sealing member 70, a difference occurring between the central portion 41 and the outer peripheral part 42 is prevented even when the shrinkage amount is different between the central portion 41 and the outer peripheral part 42 in the laminate 50; as a result, reliably forming the seal region becomes possible.

The present invention is not limited to the embodiment described above, and various modifications are possible within the scope of the claims.

Figure 20:
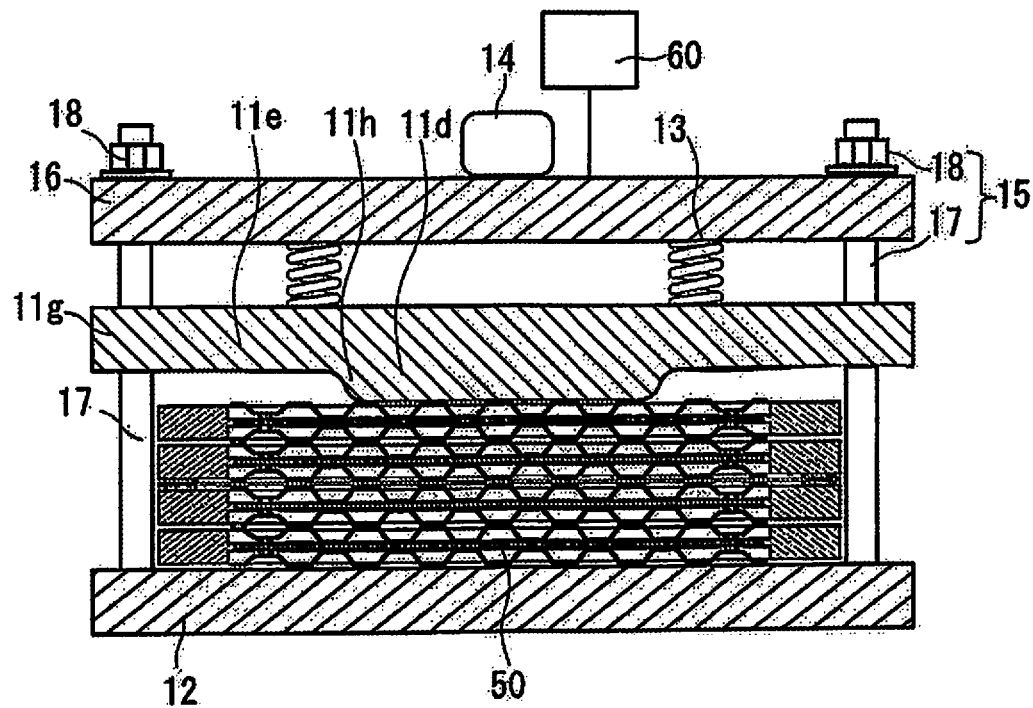
FIG. 20 is an explanatory view illustrating a modified example of a jig structure in the laminate assembly device according to the third embodiment.
Figure 21:
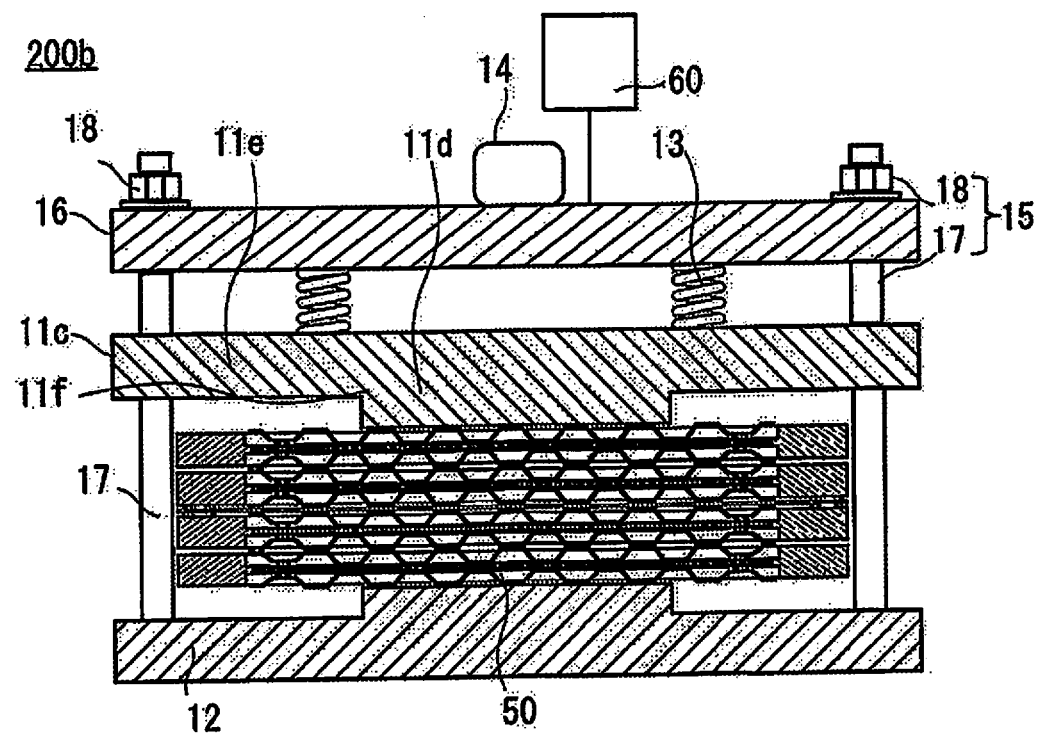
FIG. 21 is an explanatory view illustrating a modified example of a jig structure in the laminate assembly device according to the third embodiment.

FIGS. 20, 21 are explanatory views illustrating a modified example of a jig structure in the laminate assembly device according to the third embodiment. In the third embodiment, the description explained that the seal region is allowed to be formed even when the sealing member 70 undergoes heat shrinkage by providing a step 11f to the pressing jig 11c; however, the invention is not limited thereto. In the pressing jig 11g to which is provided a step, the corner of the power generation portion pressing portion 11d, which presses the central portion 41, may be formed in a curved shape 11h. By forming the corner of the power generation portion pressing portion 11d in a curved shape 11h, the contact surface pressure between the laminate 50 and the curved shape 11h will not be excessive even when pressing them; as a result, a seal region can be formed without an occurrence of scratches and the like on the laminate 50.

In addition, step 11f, which is provided in consideration of heat shrinkage or the like caused by the temperature change of the sealing member 70, may be provided not only to the pressing jig but also to the receiving jig, as illustrated in FIG. 21. In addition, in the first to the third embodiments, a plurality of fuel cells were laminated to form the fuel cell module, and a plurality of fuel cell modules were laminated to configure the laminate; however, the invention is not limited thereto; the present invention may also be applied to a case in which a seal region is formed by disposing the sealing member 70 on a single fuel cell module in which a plurality of fuel cells are laminated.

In addition, of the spaces between the MEA 31 and the separators 32a, 32b, which configure the fuel cell module 40, a corrugated shape 32c of the separators 32a, 32b and a gas diffusion layer that configures the MEA 31 are present in the portion of the central portion 41; however, such a configuration does not exist in the portion of the outer peripheral part 42. Consequently, there are cases in which the collapsing degree when a load is applied will vary between the lateral direction of the outer peripheral part 42, which is relatively far from the central portion 41, and the longitudinal direction, which is relatively near the central portion 41 of the outer peripheral part 42 when curing the sealing member, etc., by pressing the fuel cell module 40, which may have impact the sealing property. With respect to this, the difference in the collapsing degree between the longitudinal direction and the lateral direction of the outer peripheral part 42 may be eliminated by providing a hole to a part of the jig 11 in a region that is in contact with the lateral direction of the jig 11 in FIG. 4 and that connects to a pump. By providing such a configuration, the difference in the collapsing amount between the central portion 41 and the outer peripheral part 42 when curing the sealing member can be eliminated or reduced.

The invention claimed is:

1. A fuel cell stack manufacturing method having a fuel cell module in which are laminated a plurality of fuel cells, whose membrane electrode assembly, which is made by joining an anode and a cathode on both sides of an electrolyte membrane, is clamped by a pair of separators, the fuel cell stack manufacturing method comprising:
   a sealing member layout step in which a sealing member is disposed on the outer peripheral part of end surfaces that face each other between at least one of the fuel cell and another adjacent fuel cell, and the fuel cell module is formed by laminating the fuel cells; and a pressure application step in which pressure is applied to the fuel cell module in the lamination direction of the fuel cells thereby forming sealed regions from the sealing members;

a lamination-direction thickness of the fuel cell module being controlled by controlling an amount of pressure applied to the fuel cell module in the pressure application step.

2. The fuel cell stack manufacturing method according to claim 1, wherein the membrane electrode assembly comprises a power generation portion that generates energy via an electrochemical reaction, and the power generation portion and the outer portion, which is outward of the power generation portion, are pressed at different pressures in the pressure application step.

3. The fuel cell stack manufacturing method according to claim 2, further comprising:

a mounting step during which the fuel cell module is clamped by mounting a clamping portion that clamps the fuel cell module from both ends of the fuel cell module in the lamination direction, and the seal region in the pressure application step being formed by the sealing member by pressing the fuel cell module with a load that is equal to or less than a clamping pressure load that is applied when clamping the fuel cell module in the mounting step.

4. The fuel cell stack manufacturing method according to claim 2, wherein the seal region in the pressure application step is formed by the sealing member by pressing the fuel cell module with a load that is equal to or less than a load that is applied to the fuel cell module at a time of non-power generation, in a state in which the fuel cell stack is capable of power generation.

5. The fuel cell stack manufacturing method according to claim 2, wherein the seal region in the pressure application step is formed by the sealing member by pressing the fuel cell module with a load that is equal to or less than a minimum load at which the separator comes in contact with the membrane electrode assembly in the fuel cell.

6. The fuel cell stack manufacturing method according to claim 2, further comprising a retaining unit for retaining a state in which the fuel cell module is pressed; and a detection unit for detecting a load that presses the fuel cell module;

a pressing load in the pressure application step being adjusted based on a pressing load of the fuel cell module that is detected by the detection unit, and in a state in which the fuel cell module is pressed by a predetermined pressing load, the state is retained by the retaining unit.

7. The fuel cell stack manufacturing method according to claim 2, further comprising a retaining unit for retaining a state in which the fuel cell module is pressed; and a buffer member for buffering a load to the fuel cell stack via the pressing member;

a thickness of the fuel cell module in a lamination direction being retained in the pressure application step using the buffer member and the retaining unit.

8. The fuel cell stack manufacturing method according to claim 2, wherein the separator comprises an elastic shape that can be elastically deformed, and a load that is applied to the fuel cell module in the pressure application step is relaxed when forming the seal region via the sealing member by deforming the elastic shape of the separator.

9. The fuel cell stack manufacturing method according to claim 2, wherein a power generation portion pressing portion, which presses a power generation portion where power generation occurs in the fuel cell module, and an outer pressing portion, which presses outward of the power generation portion in a planar direction, of the pressing member defines a step in the lamination direction.

10. The fuel cell stack manufacturing method according to claim 1, further comprising:

a mounting step during which the fuel cell module is clamped by mounting a clamping portion that clamps the fuel cell module from both ends of the fuel cell module in the lamination direction, and the seal region in the pressure application step being formed by the sealing member by pressing the fuel cell module with a load that is equal to or less than a clamping pressure load that is applied when clamping the fuel cell module in the mounting step.

11. The fuel cell stack manufacturing method according to claim 1, wherein the seal region in the pressure application step is formed by the sealing member by pressing the fuel cell module with a load that is equal to or less than a load that is applied to the fuel cell module at a time of non-power generation, in a state in which the fuel cell stack is capable of power generation.

12. The fuel cell stack manufacturing method according to claim 1, wherein the seal region in the pressure application step is formed by the sealing member by pressing the fuel cell module with a load that is equal to or less than a minimum load at which the separator comes in contact with the membrane electrode assembly in the fuel cell.

13. The fuel cell stack manufacturing method according to claim 1, further comprising:

a retaining unit for retaining a state in which the fuel cell module is pressed; and a detection unit for detecting a load that presses the fuel cell module;

a pressing load in the pressure application step being adjusted based on a pressing load of the fuel cell module that is detected by the detection unit, and in a state in which the fuel cell module is pressed by a predetermined pressing load, the state is retained by the retaining unit.

14. The fuel cell stack manufacturing method according to claim 1, comprising:

a retaining unit for retaining a state in which the fuel cell module is pressed; and a buffer member for buffering a load to the fuel cell stack via the pressing member;

a thickness of the fuel cell module in a lamination direction being retained in the pressure application step using the buffer member and the retaining unit.

15. The fuel cell stack manufacturing method according to claim 14, wherein the buffer member is configured by a plate spring.

16. The fuel cell stack manufacturing method according to claim 1, wherein the separator comprises an elastic shape that can be elastically deformed, and a load that is applied to the fuel cell module in the pressure application step is relaxed when forming the seal region via the sealing member by deforming the elastic shape of the separator.

17. The fuel cell stack manufacturing method according to claim 1, wherein
a power generation portion pressing portion, which presses a power generation portion where power generation occurs in the fuel cell module, and an outer pressing portion, which presses outward of the power generation portion in a planar direction, of the pressing member defines a step in the lamination direction.

18. The fuel cell stack manufacturing method according to claim 17, wherein
the step defined by the power generation portion pressing portion and the outer pressing portion is equivalent to the heat shrinkage amount when the sealing member undergoes heat shrinkage.

19. The fuel cell stack manufacturing method according to claim 17, wherein
the boundary between the power generation portion pressing portion and the outer pressing portion of the pressing member is formed on a curved surface.

20. A fuel cell stack manufacturing device having a fuel cell module in which are laminated a plurality of fuel cells, whose membrane electrode assembly, which is made by joining an anode and a cathode on both sides of an electrolyte membrane, is clamped by a pair of separators, the fuel cell stack manufacturing device comprising:
a sealing member layout unit that disposes a sealing member on an outer peripheral part of end surfaces that face each other between at least one fuel cell and another adjacent fuel cell;
a lamination unit that forms the fuel cell module by laminating the fuel cells in which the sealing member is disposed;
a pressure application unit that presses the fuel cell module in a lamination direction of the fuel cell; and
a control unit for controlling the operation of the pressing unit;
the control unit being configured to control a thickness of the fuel cell module in the lamination direction by controlling a load at which the pressure application unit presses the fuel cell module.

* * * * *